(12) United States Patent
Lewis et al.

(10) Patent No.: US 10,166,579 B2
(45) Date of Patent: Jan. 1, 2019

(54) GAS VENT WITH LOW-PRESSURE RELIEF VALVE FOR LANDFILLS

(71) Applicant: WATERSHED GEOSYNTHETICS LLC, Alpharetta, GA (US)

(72) Inventors: Delaney Lewis, West Monroe, LA (US); Jose Urrutia, Atlanta, GA (US); Michael Ayers, Alpharetta, GA (US)

(73) Assignee: WATERSHED GEOSYNTHETICS LLC, Alpharetta, GA (US)

( * ) Notice: Subject to any disclaimer, the term of this patent is extended or adjusted under 35 U.S.C. 154(b) by 0 days.

(21) Appl. No.: 15/380,595

(22) Filed: Dec. 15, 2016

(65) Prior Publication Data

US 2017/0165726 A1 Jun. 15, 2017

Related U.S. Application Data

(60) Provisional application No. 62/267,660, filed on Dec. 15, 2015.

(51) Int. Cl.
*B09B 1/00* (2006.01)
*F16K 17/00* (2006.01)

(52) U.S. Cl.
CPC .............. *B09B 1/006* (2013.01); *F16K 17/00* (2013.01)

(58) Field of Classification Search
CPC ............ F16K 17/00; B09B 1/006; B09B 1/00

(Continued)

(56) References Cited

U.S. PATENT DOCUMENTS

| 207,492 | A | * | 8/1878 | Downey | ................... E03C 1/22 |
| | | | | | 137/247.15 |
| 3,593,478 | A | | 7/1971 | Mason | |

(Continued)

FOREIGN PATENT DOCUMENTS

| EP | 2361698 | 8/2011 |
| GB | 589815 | 7/1947 |

(Continued)

OTHER PUBLICATIONS

International Search Report and the Written Opinion of the International Searching Authority; for International Application No. PCT/US14/26065; dated Aug. 11, 2014; 12 pages; International Searching Authority/United States, Alexandria, US.

(Continued)

*Primary Examiner* — P. Macade Nichols
(74) *Attorney, Agent, or Firm* — Gardner Groff Greenwald & Villanueva, PC

(57) ABSTRACT

A gas vent for a landfill includes a sub-surface gas collection manifold for collecting sub-surface gas from beneath a geomembrane. Preferably, the collection manifold includes a plenum for receiving sub-surface gas. A conduit is connected to and extends upwardly from the plenum, with the conduit communicating with the interior volume of the plenum and having an upper discharge end. The conduit is adapted and provided for communicating sub-surface gas from within the interior volume of the plenum through the geomembrane. A low-pressure relief valve is operative for opening when positive pressure exists within the conduit. The low-pressure relief valve comprises a valve membrane normally resting upon a seat and which is lifted off the seat by low positive pressure.

19 Claims, 14 Drawing Sheets

(58) Field of Classification Search
USPC .................................................. 137/533, 535
See application file for complete search history.

(56) References Cited

U.S. PATENT DOCUMENTS

| | | | |
|---|---|---|---|
| 3,805,826 A * | 4/1974 | Westerhoff | E03C 1/122 |
| | | | 137/236.1 |
| 3,941,556 A | 3/1976 | Pallagi | |
| 4,483,641 A | 11/1984 | Stoll | |
| 4,487,054 A | 12/1984 | Zison | |
| 4,518,399 A | 5/1985 | Croskell et al. | |
| 5,221,159 A | 6/1993 | Billings et al. | |
| 5,259,697 A | 11/1993 | Allen et al. | |
| 5,588,490 A | 12/1996 | Suthersan et al. | |
| 5,893,680 A | 4/1999 | Lowry et al. | |
| 6,305,473 B1 | 10/2001 | Peramaki | |
| 6,742,962 B2 | 6/2004 | Hater et al. | |
| 6,749,368 B2 | 6/2004 | Ankeny et al. | |
| 6,910,829 B2 | 6/2005 | Nickelson et al. | |
| 7,153,061 B2 | 12/2006 | Nickelson et al. | |
| 7,198,433 B2 | 4/2007 | Augenstein et al. | |
| 7,309,431 B2 | 12/2007 | Degarie | |
| 7,448,828 B2 | 11/2008 | Augenstein et al. | |
| 7,722,289 B2 | 5/2010 | Leone | |
| 7,972,082 B2 | 7/2011 | Augenstein et al. | |
| 8,002,498 B2 | 8/2011 | Leone et al. | |
| 8,047,276 B2 | 11/2011 | Stamoulis | |
| 8,168,121 B2 | 5/2012 | Elkins | |
| 8,192,111 B2 | 6/2012 | Zimmel | |
| 8,398,335 B2 | 3/2013 | Stamoulis | |
| 2003/0008381 A1 | 1/2003 | Augenstein | |
| 2003/0111122 A1 | 6/2003 | Horton | |
| 2004/0103866 A1 | 6/2004 | Benjey | |
| 2004/0112607 A1 | 6/2004 | Beckhardt | |
| 2005/0082830 A1 | 4/2005 | Voelker | |
| 2005/0236042 A1 | 10/2005 | Hansen et al. | |
| 2006/0034664 A1 | 2/2006 | Augenstein | |
| 2008/0017558 A1 | 1/2008 | Pollock et al. | |
| 2009/0136298 A1 | 5/2009 | Augestein et al. | |
| 2011/0302876 A1 | 12/2011 | Giffin | |

FOREIGN PATENT DOCUMENTS

| | | |
|---|---|---|
| JP | 11216440 | 8/1999 |
| JP | 2003340392 | 12/2003 |
| WO | 2007/103153 | 9/2007 |
| WO | 2008/061294 | 5/2008 |
| WO | 2011148139 | 11/2012 |

OTHER PUBLICATIONS

Barometrically Enhanced Remediation Technology (BERT); Innovative Technology Summary Report, Mar. 2000, 28 pages, Prepared for U.S. Department of Energy, Office of Environmental Management, Office of Science and Technology, US.

International Search Report and The Written Opinion of the International Searching Authority; for International Application No. PCT/US14/22991; dated Jul. 3, 2014; 8 pages; International Searching Authority/United States, Alexandria, US.

* cited by examiner

GAS VENT WITH LOW-PRESSURE RELIEF
VALVE FOR LANDFILLS

CROSS-REFERENCE TO RELATED
APPLICATIONS

This application is filed as a non-provisional of U.S. Provisional Application Ser. No. 62/267,660 filed Dec. 15, 2015, which is hereby incorporated herein by reference.

BACKGROUND

As waste material decomposes in a landfill, it gives off various gases. In the past, it has been known to use pumps, piping, and wellheads to extract the gases from the landfill and collect the same. Such wellheads are often spaced about one per acre in a grid pattern. Such systems of collecting the gases can be shut down by many factors, including power failures. To prevent the undesirable build-up of such gases in the event of non-operation of the extraction system, it has often been known to employ a grid pattern of vents spaced between the extraction wellheads, often at the same one per acre density.

As described in published U.S. Patent Application Number 20060034664, conventional gas extraction wells at landfills often involve deep wells attached to a network of pipes and a gas pump (blower) that applies vacuum (negative pressure) to extract the gas from the stored waste as the waste decomposes. The profile of surface emission flux is recognized to lead to potential for some emissions away from the wells under many circumstances. Note also that there is almost always entrainment of gas, whether LFG or atmospheric air, through the surface area most proximate to deep collection. Both LFG emission far from wells, and air entrainment proximate to subsurface collection, are well recognized as deleterious to collection efficiency. A "tradeoff" exists between extracting or "pulling" at too high a flow rate and entraining excessive atmospheric air, and pulling too little and recovering less LFG. This poses one dilemma of conventional extraction.

A prior art arrangement according to the above published patent application is shown in FIG. 1. Landfill 1 containing waste 2 generates biogas (biogas flows shown by the arrows). Biogas is collected and extracted through a well 3. The well 3 includes a gas-collecting well screen 16 and a gas-impermeable conduit 17 linking the well screen to the surface to draw biogas from the wellhead to the surface. Overlaying the majority of the waste 2 is a gas-permeable layer 5. The term "wellhead" refers to a portion of the gas-extraction well from which gas can be extracted. The well often includes a section of pipe having slots or other gas-flow apertures cut in it, referred to as a "well screen". Often, the well screen is also surrounded with gravel. The gas-permeable layer is typically composed of a conductive porous matrix with gas flow paths. Often it is composed of rigid or semi-rigid particles of a large enough size to leave a significant void volume between particles. For instance, the gas-permeable layer may contain sand, gravel, wood chips, or shredded tires. Above the gas-permeable layer is a gas-containment layer 7. Biogas that rises from the landfill reaches the gas-permeable layer where it is trapped by the overlying gas-containment layer 7. The biogas migrates horizontally in the gas-permeable layer until it comes close to a well. Gas extraction from the well creates a vacuum that draws gas into the well. This vacuum draws biogas from the overlying gas-permeable layer down through the waste mass of the landfill to reach the well. The area immediately beneath the gas-permeable high conductivity layer 5 through which a substantial fraction of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not. It is sometimes desirable to place an even more impermeable layer, such as geomembrane 15, directly over the zone of entrainment of gas from the permeable layer that is created by the deep well. Moreover, sometimes the entire landfill is covered with such a membrane.

When such gas extraction from landfills is interrupted, such as by power outages or equipment failure, it is important to continue to remove the gas from the landfill, to prevent the gas from building up and destabilizing the covering. As described above, the use of passive vents has been common. Such passive vents often take the form of a pipe stuck in the ground with a turned-down upper end to prevent rain from entering the vent. Sometimes such vents have valves in them, other times not. In any event, ideally such a vent should work automatically, whether there is available electric power or not, and be mechanically robust and reliable.

Accordingly, it can be seen that there exists a need for a better way for venting sub-surface gas from near the surface of landfills. It is to the provision of solutions to this and other problems that the present invention is primarily directed.

SUMMARY OF THE INVENTION

In a first example form the present invention comprises a gas vent for a landfill. In example embodiments, the gas vent includes a sub-surface gas collection manifold for collecting sub-surface gas from beneath a geomembrane. Preferably, the collection manifold includes a plenum for receiving sub-surface gas, and the plenum defines an interior volume. A conduit is connected to and extends upwardly from the plenum, with the conduit communicating with the interior volume of the plenum and having an upper discharge end. The conduit is adapted and provided for extending through an aperture in the geomembrane for communicating sub-surface gas from within the interior volume of the plenum through the geomembrane. A low-pressure relief valve is associated with the conduit and is operative for opening when positive pressure exists within the conduit. The low-pressure relief valve comprises a valve membrane normally resting upon a seat and which is lifted off the seat by low positive pressure. A hood is positioned adjacent an upper portion of the conduit and defines a discharge chamber therein into which gas from the discharge end of the conduit is discharged.

In one form, the vent is adapted and configured to vent the gas more or less directly to atmosphere. In another example form, the vent is adapted and configured to vent the gas to an external gas collection system for destruction.

Preferably, the valve membrane is affixed to a canister and the canister is fitted loosely about the upper discharge end of the conduit such that low positive pressure in the conduit lifts the valve membrane and thus opens the low-pressure relief valve. Preferably, the canister is lightweight such that even slight positive pressures within the conduit are operative to open the valve by lifting the valve membrane.

Preferably, the hood also has a discharge outlet for venting gas from within the discharge chamber to atmosphere. Preferably, the hood is affixed to the conduit. Optionally, the hood is substantially cylindrical. Optionally, the conduit is rigidly connected to and extends upwardly from a substantially flat portion of the plenum. Also optionally, the hood includes one or more lower discharge ports.

In another example form, the present invention comprises a gas vent for a landfill. Preferably, the gas vent is adapted for use with a sub-surface gas collection manifold for collecting sub-surface gas from beneath a geomembrane. A conduit is connected to and extends upwardly from the manifold, with the conduit communicating with the interior volume of the manifold and having an upper discharge end. The conduit is adapted and provided for extending through an aperture in the geomembrane for communicating sub-surface gas from within the interior volume of the manifold through the geomembrane. A low-pressure relief valve is associated with the conduit and is operative for opening when positive pressure exists within the conduit. The low-pressure relief valve comprises a valve membrane normally resting upon a seat and which is lifted off the seat by low positive pressure.

BRIEF DESCRIPTION OF THE DRAWING FIGURES

DESCRIPTION OF EXAMPLE EMBODIMENTS

The present invention relates to a vent for landfill gas, collected using a near-surface collection manifold for venting sub-surface gas. Typically, such gas is trapped beneath a geomembrane M for capping a waste field W. The geomembrane M is generally impermeable to contain or cap the waste below, thereby restricting the sub-surface gas from flowing into the atmosphere and restricting atmospheric air from flowing into the waste below the geomembrane M.

Figure 1:
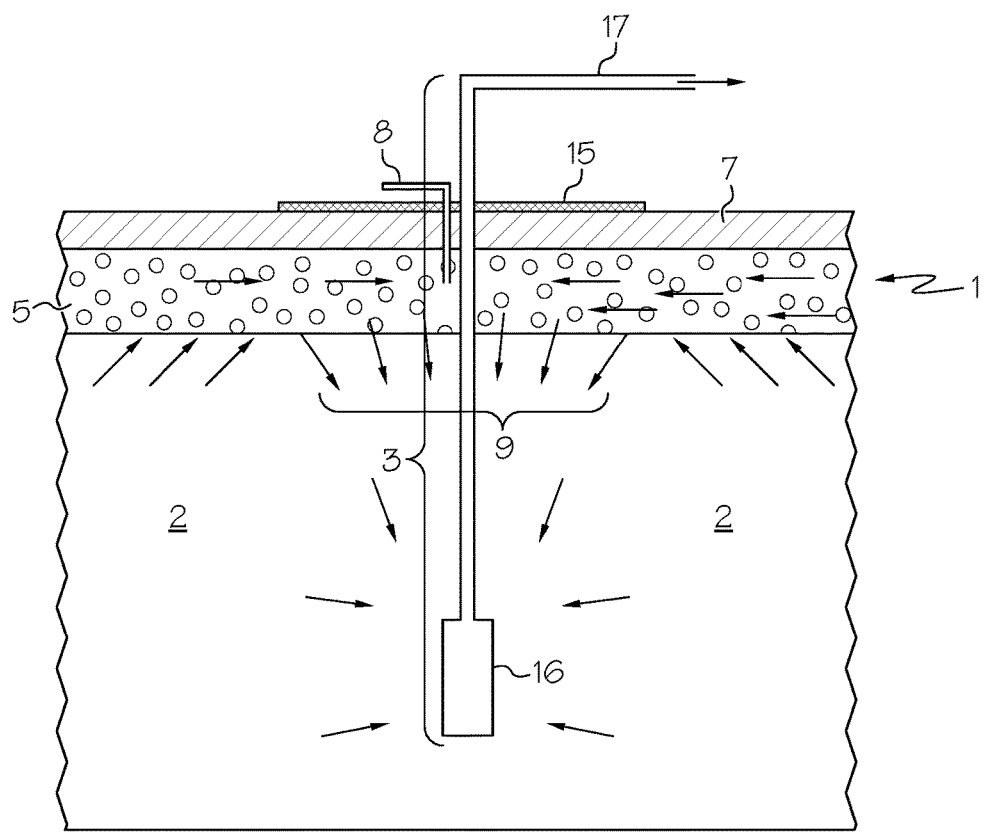
FIG. 1 is a schematic illustration of a first prior art wellhead for extracting sub-surface gas from a waste landfill.
Figure 2:
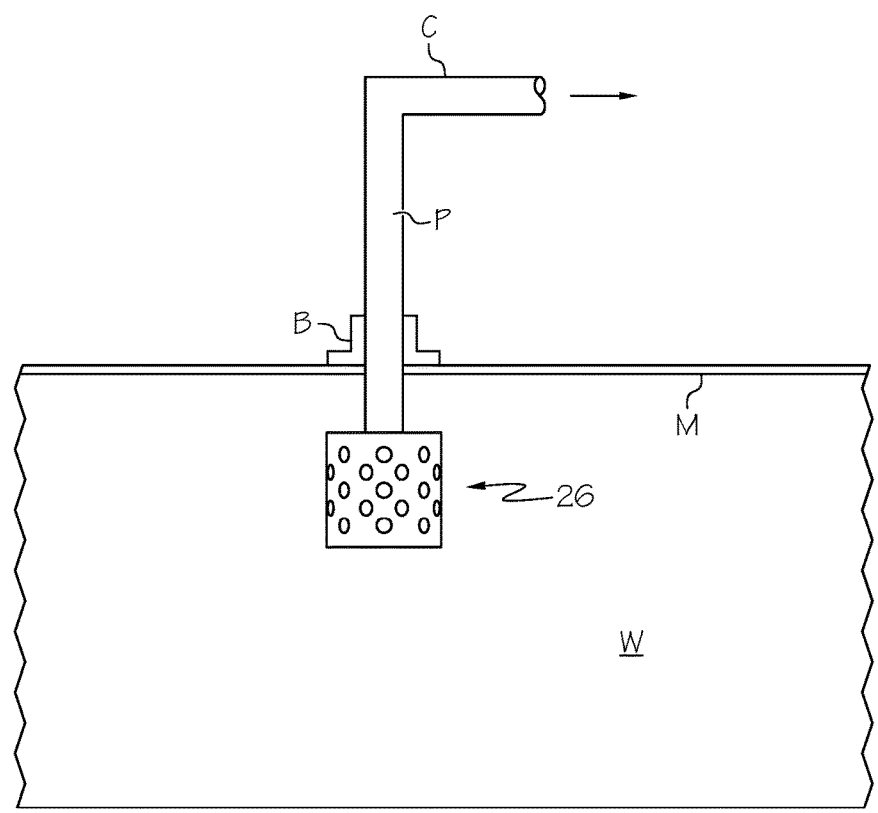
FIG. 2 is a schematic illustration of a second prior art wellhead for extracting sub-surface gas from a waste landfill.
Figure 3:
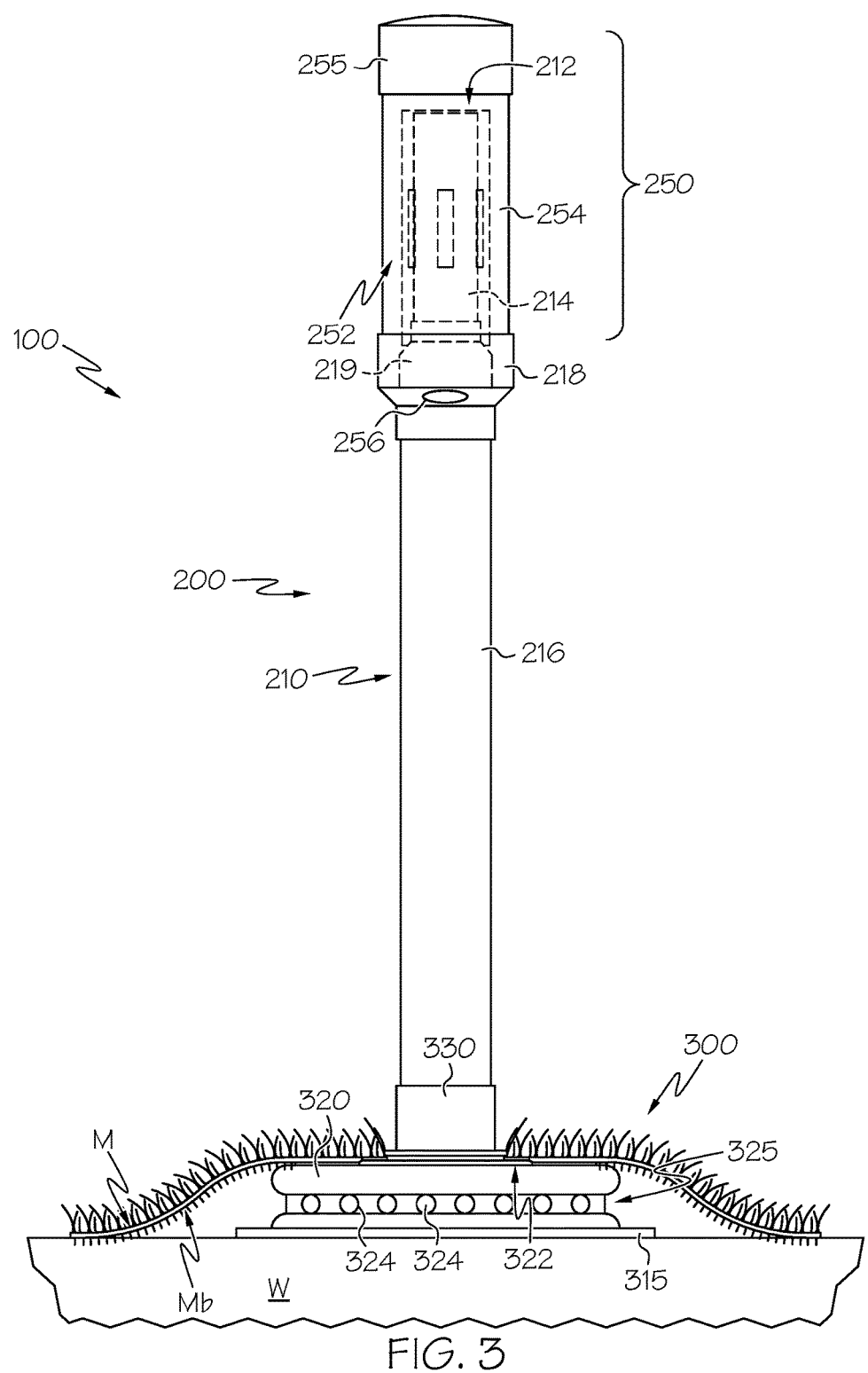
FIG. 3 is a schematic, elevation view of a gas vent for a landfill according to a first preferred example form of the present invention, shown installed under a geomembrane.
Figure 4:
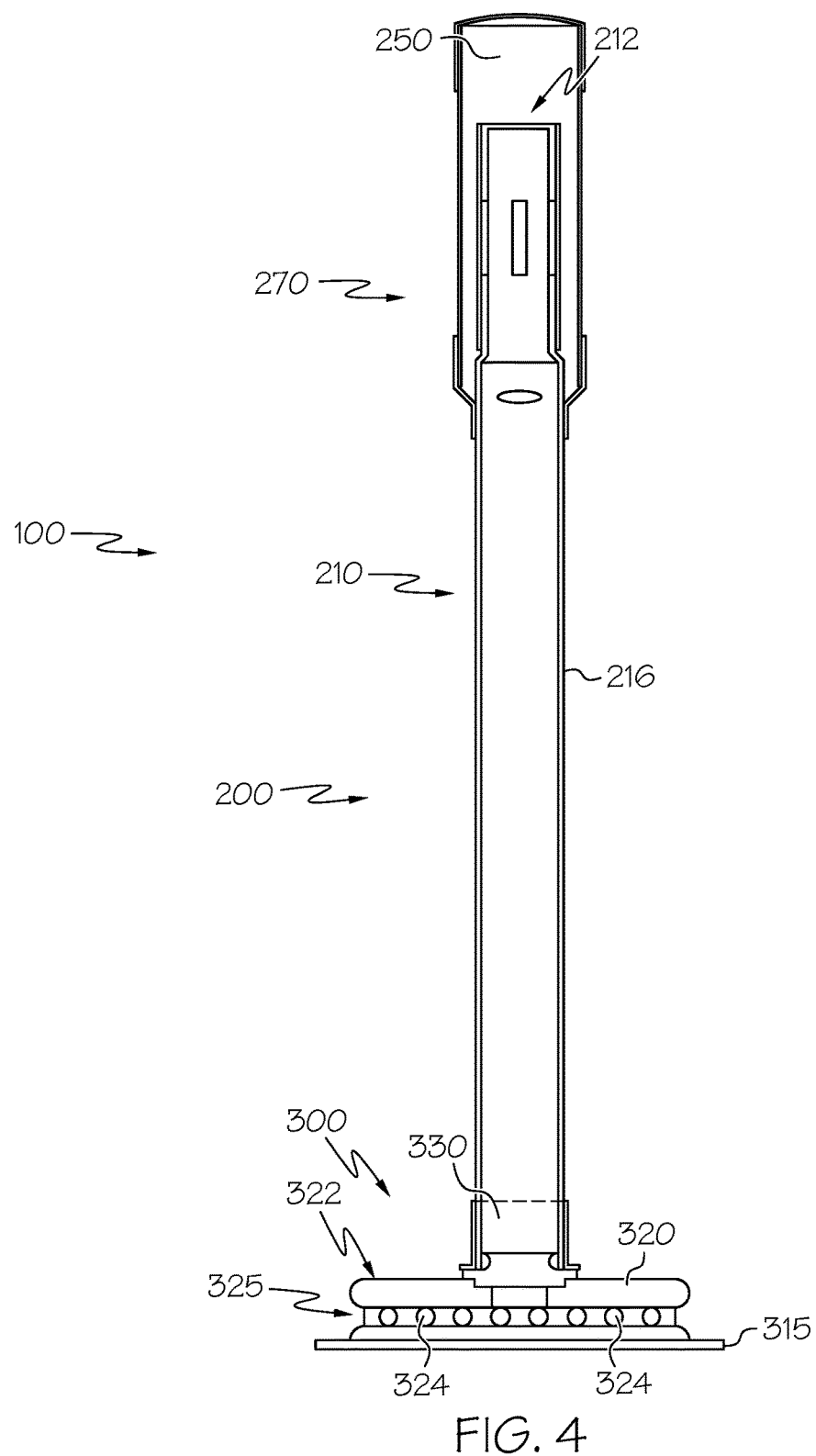
FIG. 4 is another schematic elevation view of the gas vent for a landfill of FIG. 3.
Figure 5:
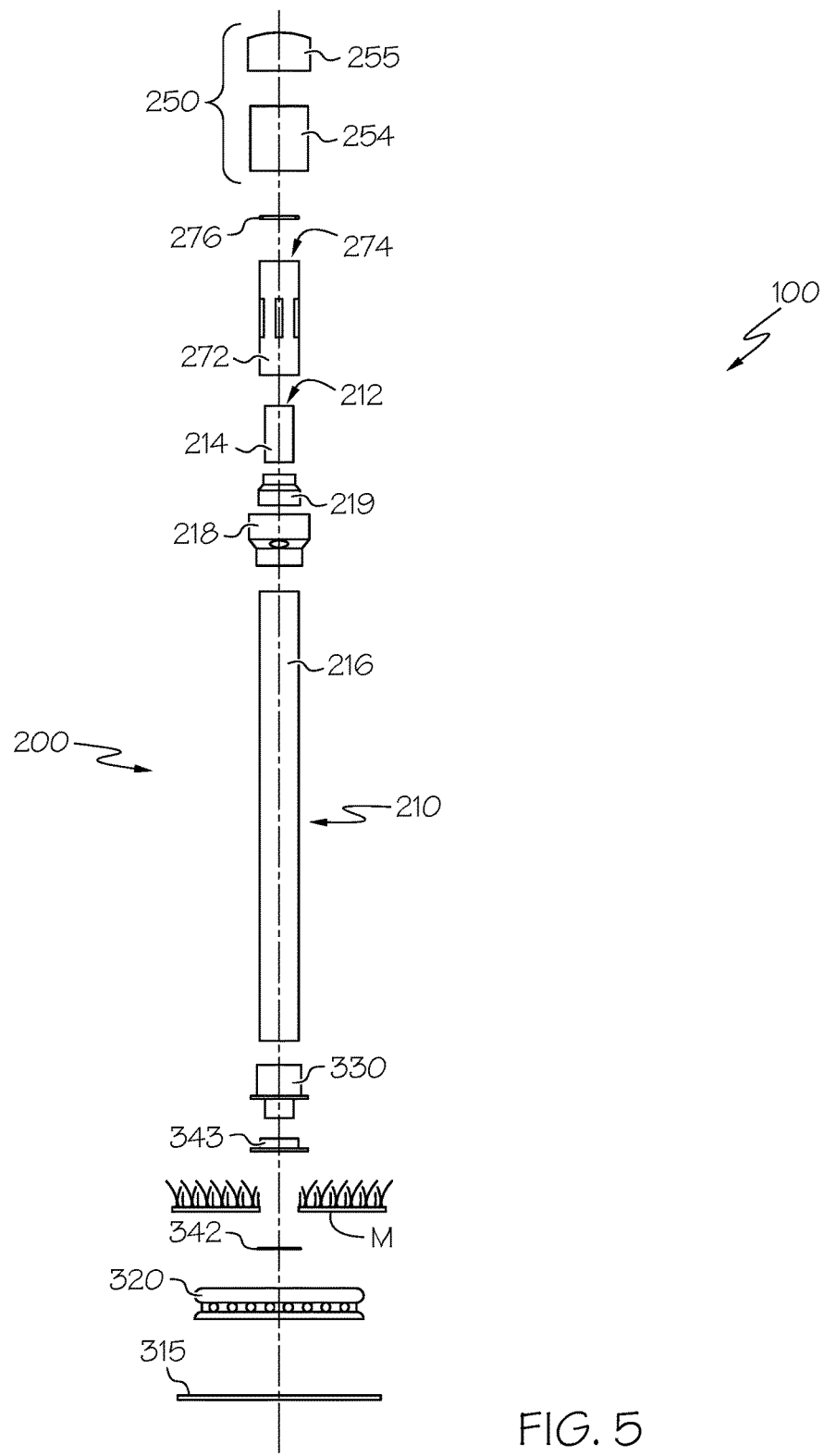
FIG. 5 is a schematic exploded view of gas vent for a landfill of FIG. 3.

FIGS. 3-5 show a vent 100 according to a first preferred form of the invention, including an above-ground portion 200 and a sub-surface collection manifold 300 for extracting and/or venting sub-surface gas from a waste landfill according to a preferred example embodiment of the present invention. As will be appreciated from reading the following and viewing these figures, the example embodiment of FIGS. 3-5 is shown as a valve that is vented to atmosphere.

The collection manifold 300 includes a generally puck-shaped plenum 320 having an enclosure with a substantially flat upper portion 322 and defines an interior volume, and perforations 324 are formed in the base of a recessed peripheral groove 325 of the plenum to provide for the admission of sub-surface gas into the interior volume. The recessed groove 325 provides good protection against the membrane being drawn against the openings of the perforations 324 and blocking the perforations.

The manifold 300 includes a base plate 315 bonded to the underside of the plenum 320. In one preferred form, the base plate 315 is about 3 feet square and ½ inch thick. The purpose of the base plate 315 is to provide a sturdy base to help keep the manifold upright despite side loads that might tend to want to topple the manifold. Note that the plenum 320 preferably is round, while avoiding sharp corners that might tear the membrane M due to the close proximity of the plenum to the membrane. This is less of a concern with the base plate and the base plate can be provided with generally square corners or rounded corners, as desired. Preferably, both the base plate and the plenum are made of high density polyethylene or similar rugged polymers, but those skilled in the art will appreciate that various construction materials can be employed. In one preferred form, the plenum 320 is about 18 inches across and several inches tall.

When the collection manifold 300 is mounted adjacent the geomembrane M, the plenum 320 sits close below the geomembrane M proximal the waste W, allowing the substantially flat upper portion 322 of the plenum 320 to contact a bottom surface Mb of the geomembrane M. A threaded conduit coupling 330 extends upwardly from the substantially flat upper portion 322 and communicates with the interior volume of the plenum 320 and preferably is rigidly connected to the plenum by plastic welding. Optionally, the conduit coupling 330 can be integrally formed with the plenum. Also, the conduit coupling can have coupling features for mounting to the geomembrane M.

The conduit coupling 330 extends through a central opening of a flat gasket 342 so that the geomembrane M is sandwiched between the flat gasket 342 and the substantially flat upper portion 322 of the plenum 320. Preferably, the flat gasket 342 is formed from a resilient material for providing a compressible seal. In one form, the flat gasket 342 comprises a polymeric sheet having an annular and/or disc-like shape. Alternatively, the flat gasket 342 can be shaped as desired and can comprise other available materials. Optionally, a second flat gasket can be provided such that the geomembrane M is positioned between the two gaskets.

A threaded nut 343 engages external threads of the conduit 330 above the flat gasket 342 and secures the flat gasket 342 against the geomembrane M, thus sealing the geomembrane M to the substantially flat upper portion 322 of the plenum 320. Optionally, a large flat washer is positioned between the threaded nut 343 and the gasket to provide a uniform clamping force and to avoid galling the flat gasket 342 as the threaded nut 343 is tightened. The washer can be a separate item or can be integrally formed on an underside of the nut 343.

A conduit 210 is connected to and extends upwardly from the plenum, with the conduit 210 communicating with the interior volume of the plenum and having an upper discharge end 212. In the example embodiment of FIGS. 3-5, the conduit 210 has an upper portion 214 which is coupled to the lower portion 216 by a coupling 218 and a coupling 219. However, instead of two pieces connected by one or more couplings, the conduit 210 can be provided as a single piece. In the example shown in FIGS. 3-5, the lower portion is a length of 4" diameter PVC, while the upper portion is a length of 3" diameter PVC, and they are coupled together with a 4-to-3" coupling 219 and a 6"-to-4" coupling 218.

The conduit is adapted and provided for extending through an aperture in the geomembrane for communicating sub-surface gas from within the interior volume of the plenum through the geomembrane. A hood 250 is positioned adjacent an upper portion 214 of the conduit 210 and defines a discharge chamber 252 therein into which gas from the discharge end of the conduit is discharged, the discharge chamber being between the inside wall of the hood 250 and the outside wall of the upper portion 214 of the conduit. The hood 250 also has a pair of discharge outlets, such as discharge outlet 256, for venting gas from within the discharge chamber to atmosphere. The hood includes a 6" diameter cylindrical section 254 and is capped with a weather-proof cap 255.

Preferably, the hood 250 is affixed to the conduit 210 using the 6"-to-4" reducer 218. Optionally, the hood 250 is substantially cylindrical. Optionally, the conduit is rigidly connected to and extends upwardly from a substantially flat portion of the plenum. Also optionally, the hood 250 includes one or more lower discharge ports.

The valve portion 270 of the vent includes a lightweight canister 272 having an upper end 274 covered with a thin, flexible valve membrane 276. In one preferred form, the valve membrane is made of thin sheet neoprene, about 1/32" or 1/64" thick. Preferably, the valve membrane is stretched over the open upper end 274 of the valve 270 and secured thereat. The lightweight canister can take a cylindrical form or a corrugated pipe form. The inventors have found that a thin, lightweight corrugated pipe works well as the canister, both as to maintaining its shape and effectively retaining a neoprene valve membrane 276 simply by stretching the membrane over the open end of the canister and extending it down the sides of the canister somewhat, whereupon the indented portions of the corrugations tend to grip and hold the sides of the valve membrane. Alternatively, a smooth cylinder canister can be employed and an optional clamp can be used to secure the sides of the valve membrane to the sides of the smooth cylinder canister.

The lightweight canister 272 is loosely fitted about and atop the upper portion 214 of the conduit 210. As will become more clear below, gravity pulls the lightweight canister 272 downwardly atop the open end of the upper portion 214 of the conduit, normally sealing the conduit against air being drawn into the conduit from above ground. When pressure in the conduit is negative, this seal is made more positive/effective. When pressure in the conduit is positive, the pressure beneath the valve membrane 276 gently lifts the valve membrane 276, and with it the canister 272. With the valve membrane 276 lifted slightly, the gas under pressure in the conduit can escape from the conduit into the hood 250, whereupon it is then vented to atmosphere.

With such an arrangement, as best seen in FIG. 4, the gas to be vented flows up from the plenum, through the conduit 210 to its upper discharge end 212. Once exiting the upper end 212 of the conduit 210 and being received in the discharge chamber 252 of the hood 250, the gas turns downwardly and ultimately exits through the lower discharge ports 256, 258 in the hood 250. Thus, the gas is thereby vented to atmosphere.

Figure 6A:
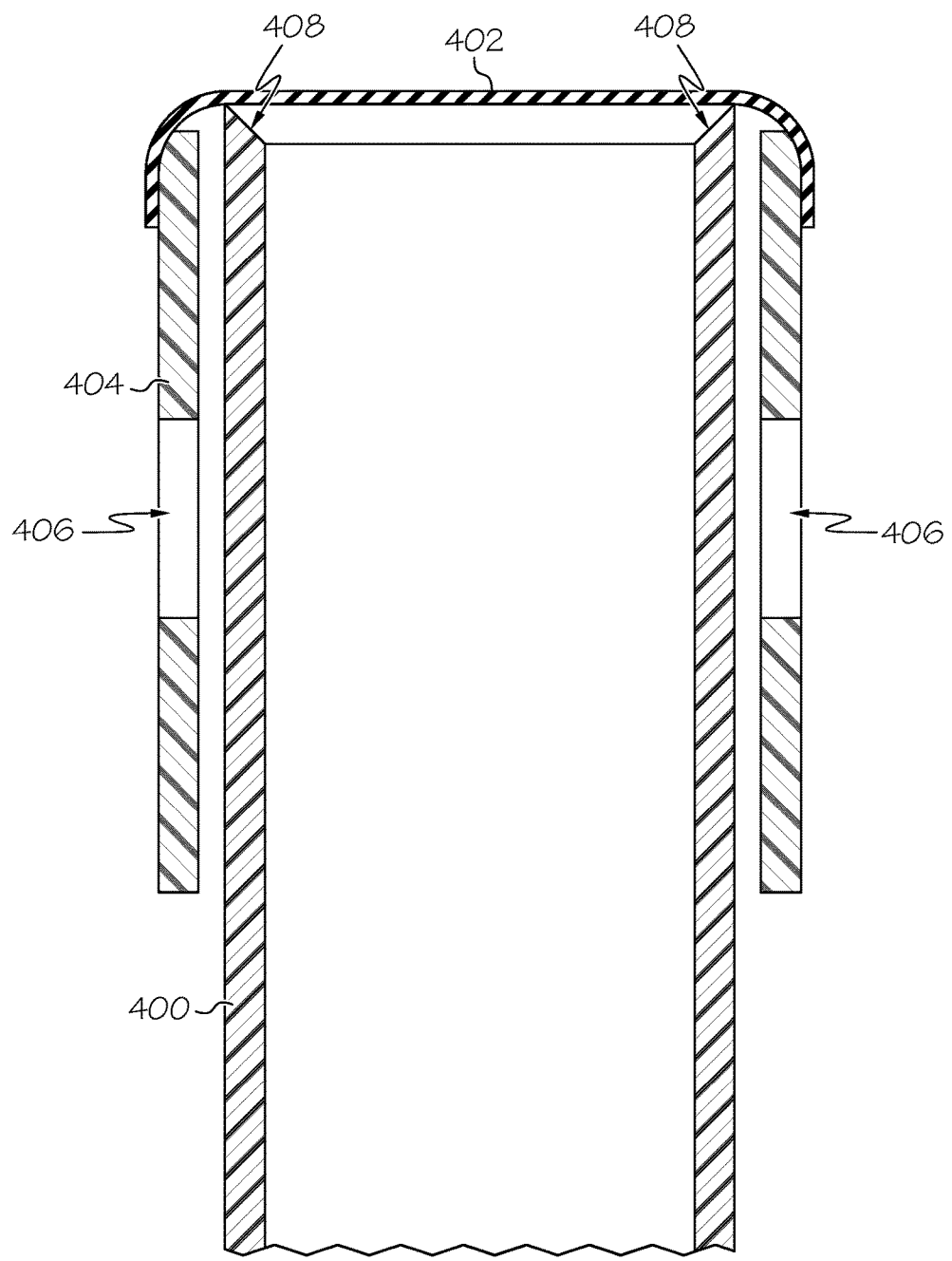
FIG. 6A is a schematic, sectional view of a portion of a gas vent for a landfill according to a second preferred example form of the present invention, shown with the valve portion thereof in a closed position.
Figure 6B:
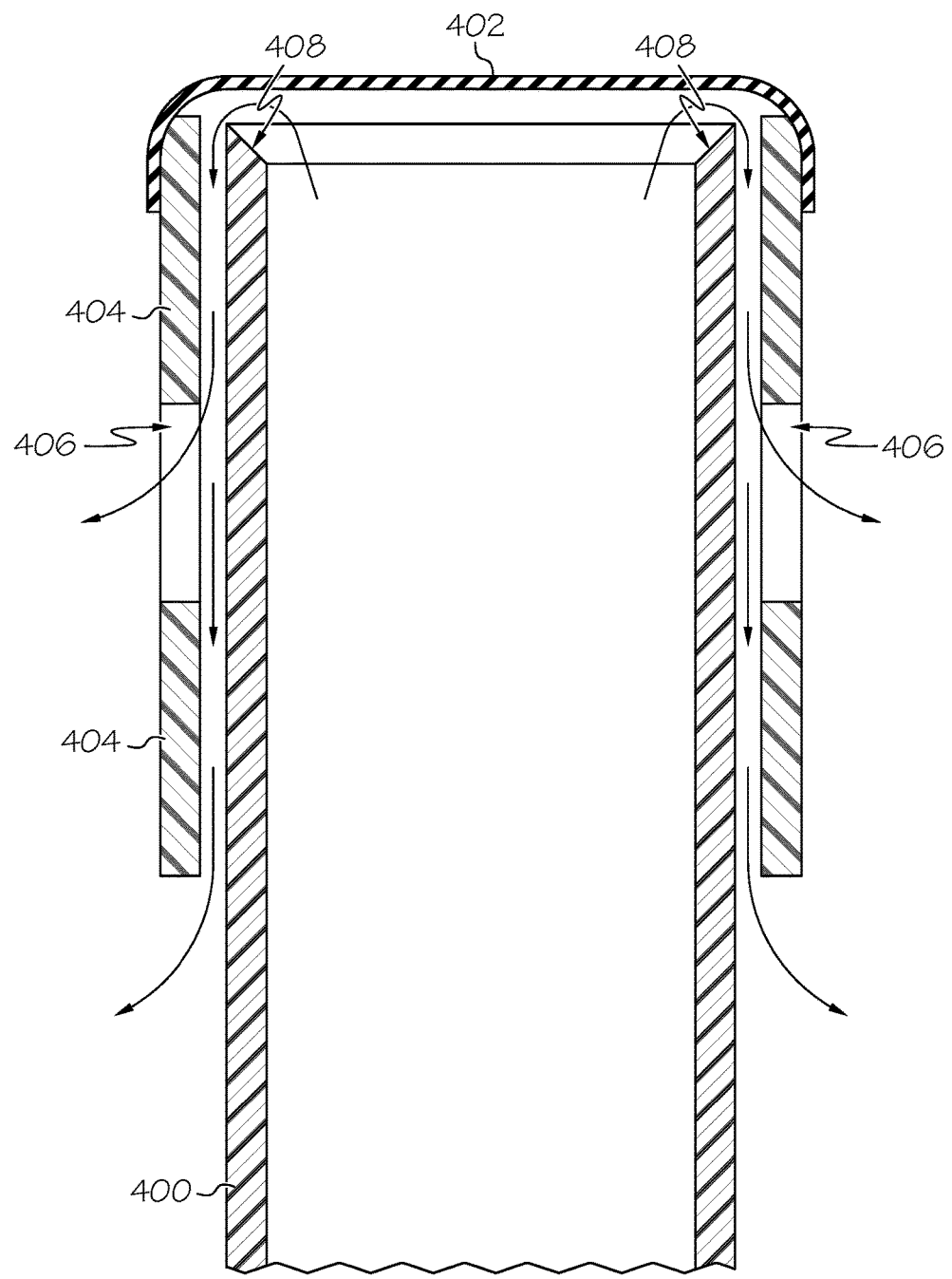
FIG. 6B is a schematic, sectional view of the portion of a gas vent of FIG. 6A, shown with the valve portion thereof in an open position.

FIGS. 6A & 6B depict an alternative canister 404 that is loosely fitted about and atop the upper portion 408 of an alternative conduit 400. The conduit upper portion 408 has a pointed knife-like edge around the circumference. Similarly to the embodiment described in FIGS. 3-5, gravity pulls the canister 404 downwardly atop the open end of the upper portion 408 and the contact between the pointed knife-like circumferential edge and the valve membrane 402 to create a normal seal against air being drawn into the conduit 400 from above. With the valve membrane 402 lifted slightly, as depicted in FIG. 6B, the gas under pressure in the conduit 400 can escape the conduit, for example into the hood 250. The canister 404 is further depicted to have at least one, and preferably a pair of, apertures 406 along the side-wall. These apertures 406 can be slits, perforations or holes. As depicted in FIG. 6B air escaping the conduit 400 can also be released through the apertures 406.

Figure 7:
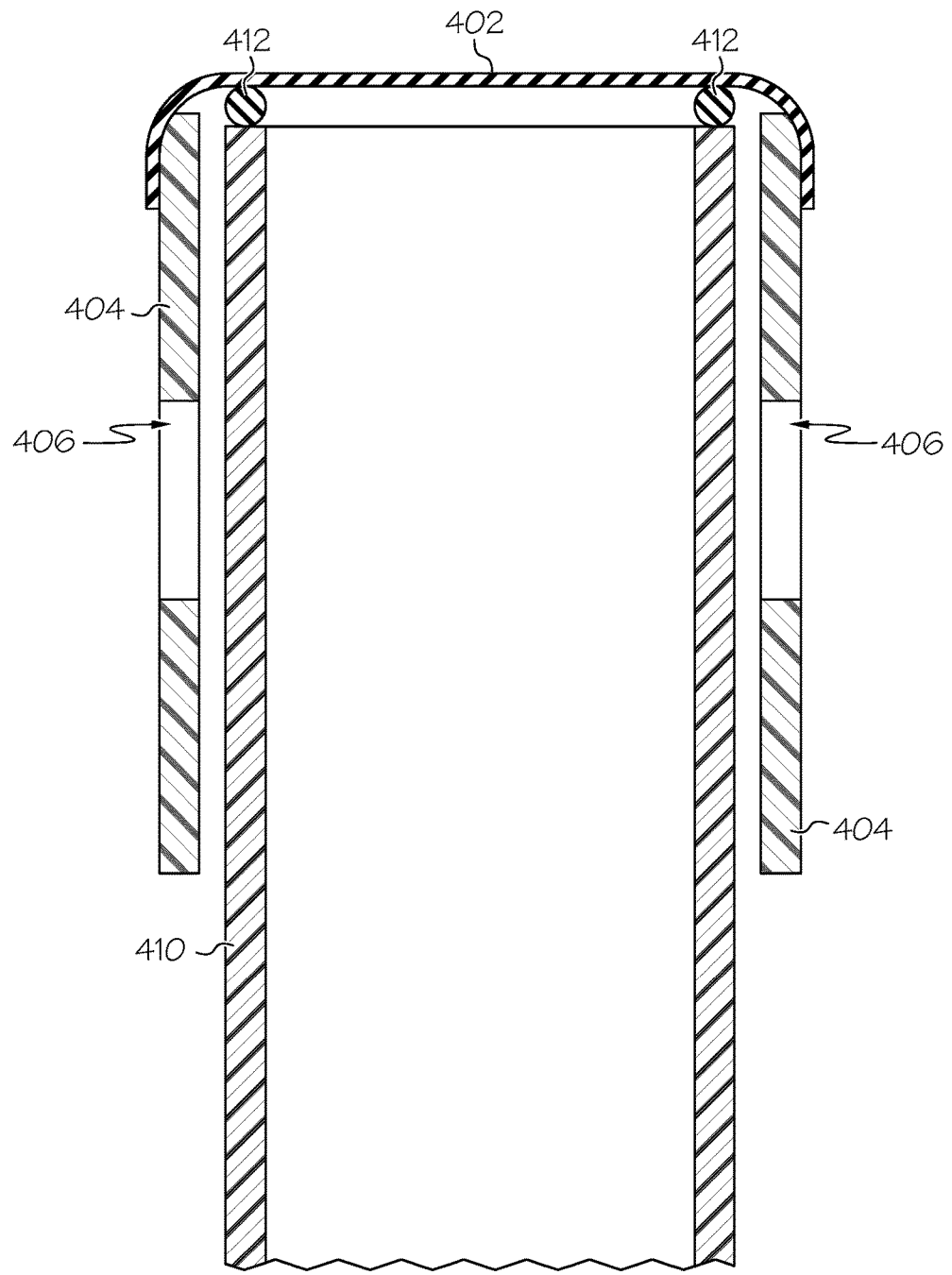
FIG. 7 is a schematic, sectional view of a portion of a gas vent for a landfill according to a third preferred example form of the present invention, shown with the valve portion thereof in a closed position.

FIG. 7 depicts an alternative conduit 410 with an annular ring 412 positioned around the upper portion edge circumference. The annular ring 412 can be a rubber O-ring. Similarly to the pointed knife-like conduit edge 408 described above, the annular ring 412 has a narrow point of contact with the valve membrane 402 to create a natural seal with the valve membrane 402. The valve membrane 402 also lifts from the annular ring 412 to release gas as described in previous embodiments.

Figure 8:
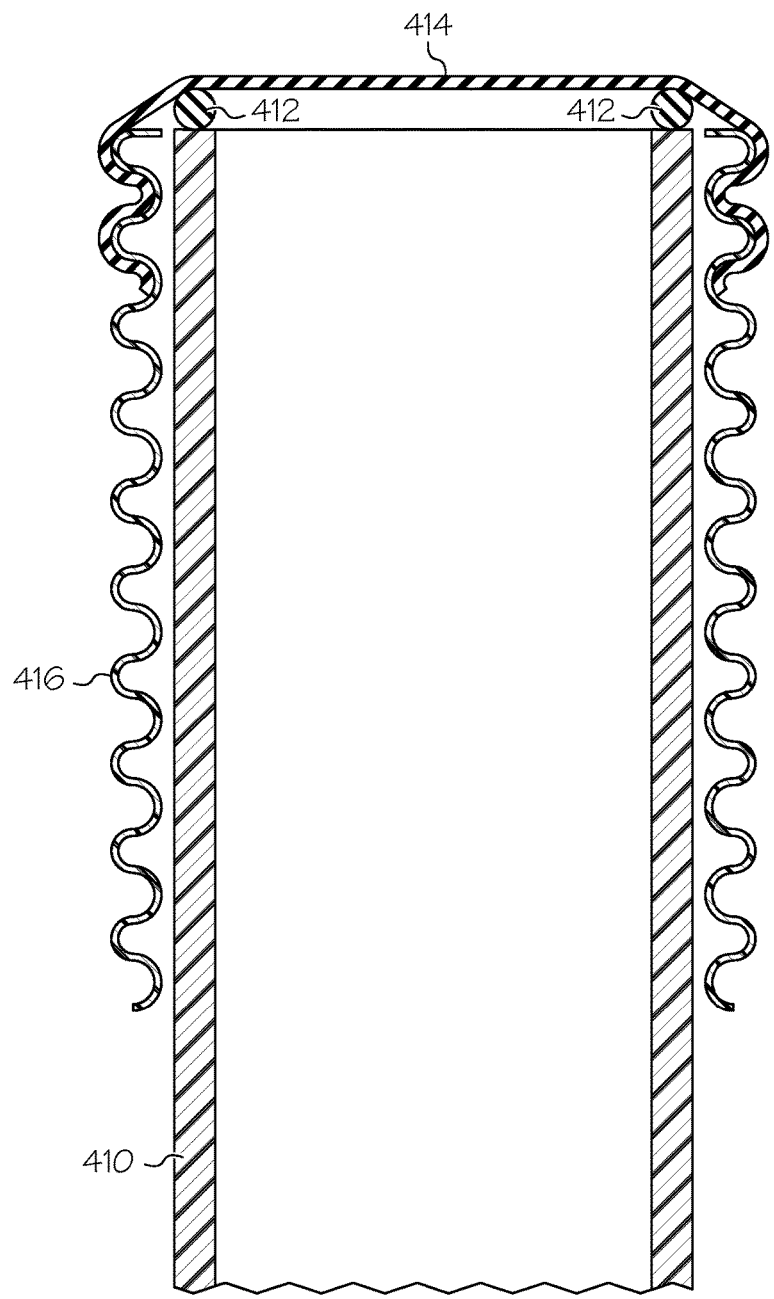
FIG. 8 is a schematic, sectional view of a portion of a gas vent for a landfill according to a fourth preferred example form of the present invention, shown with the valve portion thereof in a closed position.
Figure 9:
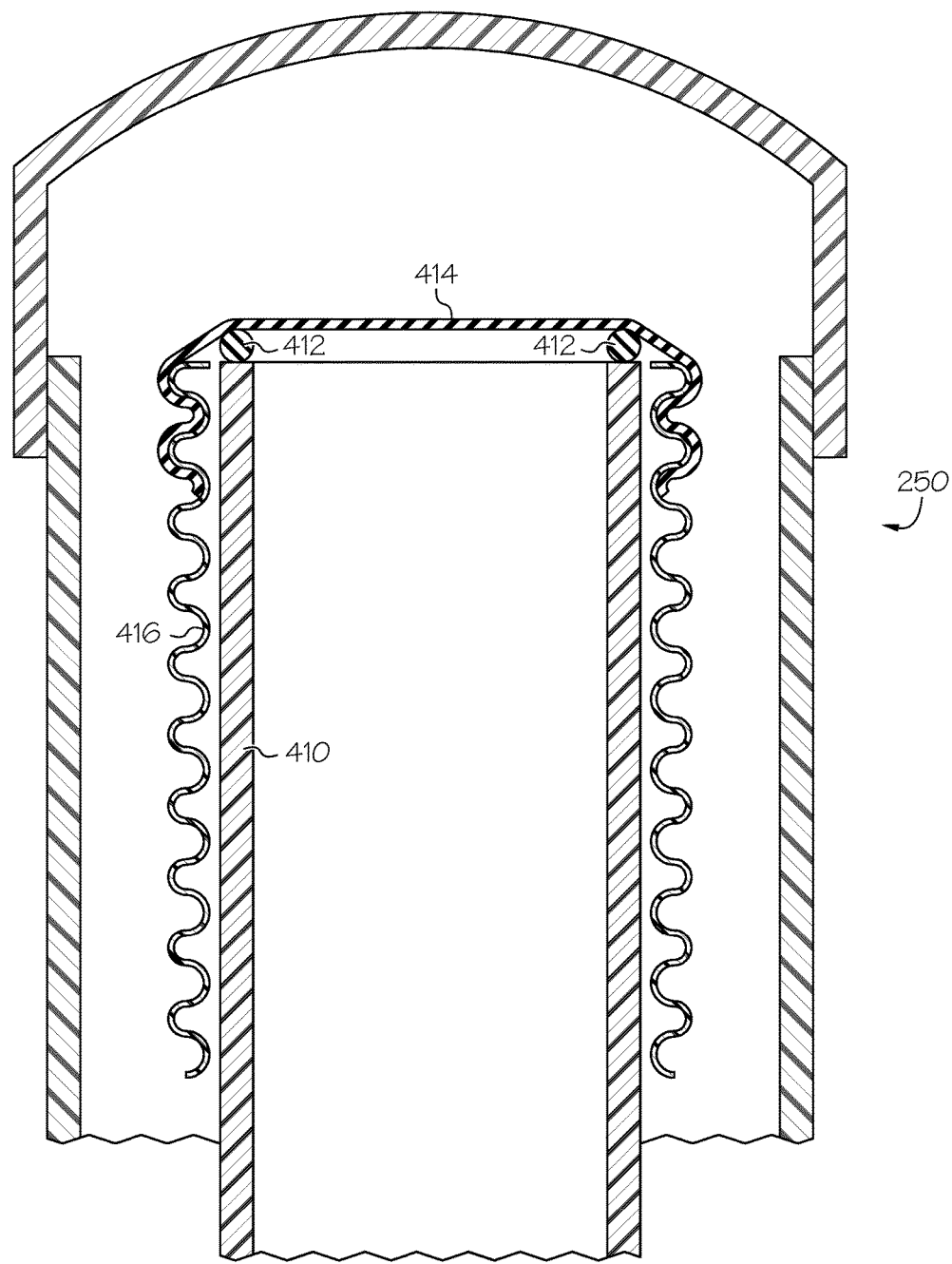
FIG. 9 is a schematic, sectional view of the portion of a gas vent of FIG. 8, shown with a hood portion of the gas vent.

FIG. 8 depicts an alternative canister 416 with a valve membrane 414 that functions similarly to the canister and valve membranes described in FIGS. 3-7. The canister 416 has a corrugated circumferential surface, which is lightweight and rigid. The valve membrane 414 secures over the corrugated circumferential surface of the canister 416 and creates the natural seal with a conduit upper portion. As shown, the valve membrane 414 creates a natural seal with the annular ring 412 in conduit 410 shown in FIG. 7, however, the valve membrane could also function similarly with the pointed knife edge 408 in conduit 400 shown in FIGS. 6A & 6B. The conduit 410 and canister 416 are shown in FIG. 9 installed within the hood 250 described in FIGS. 3-5.

Figure 10:
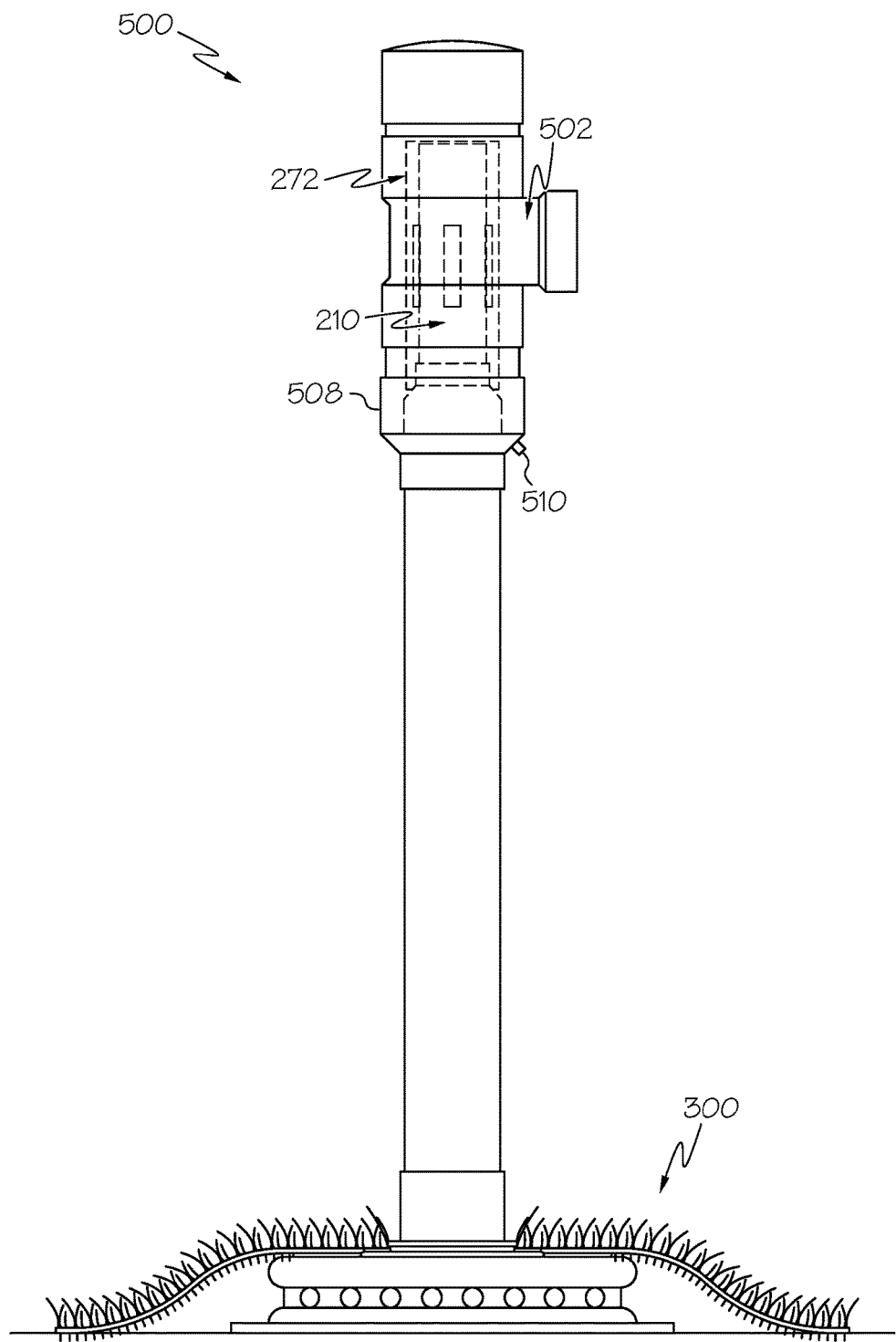
FIG. 10 is a schematic, elevation view of a gas vent for a landfill according to a fifth preferred example form of the present invention, having connectivity to a gas collection system and shown installed under a geomembrane.
Figure 11:
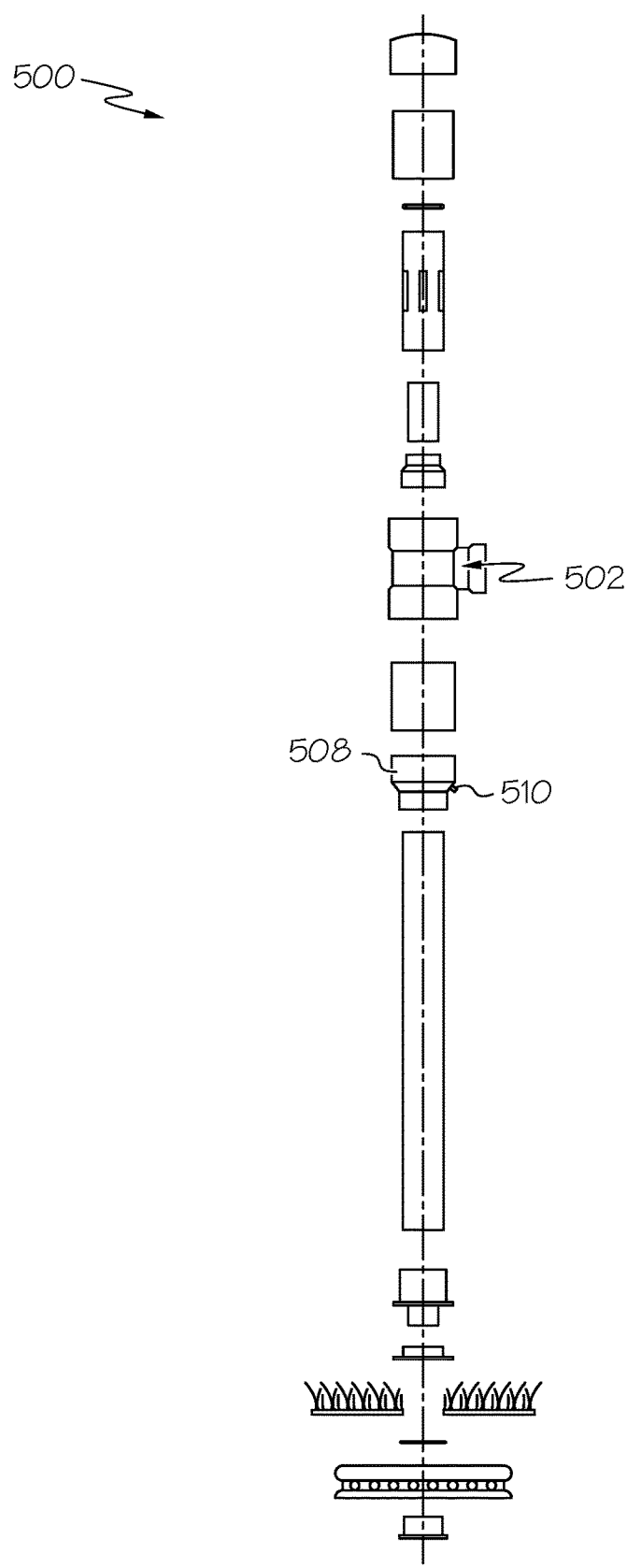
FIG. 11 is a schematic exploded view of gas vent for a landfill of FIG. 10.
Figure 12:
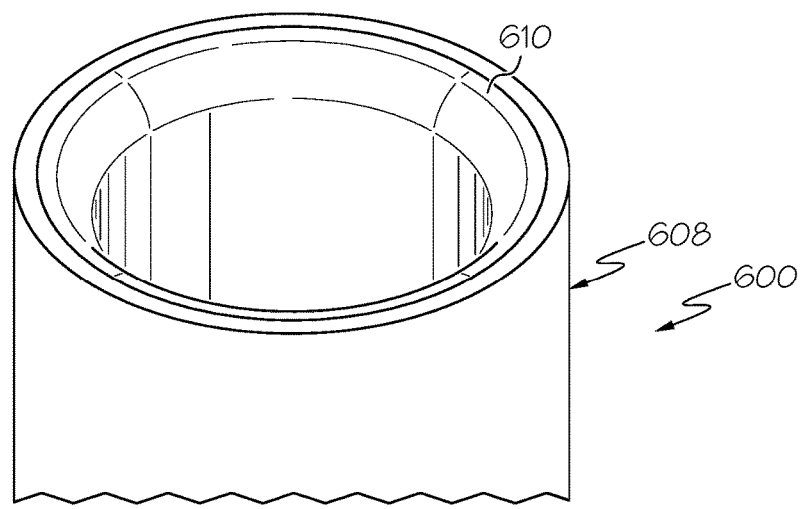
FIG. 12 is a schematic, perspective view of a portion of a gas vent for a landfill according to a fifth preferred example form of the present invention.
Figure 13:
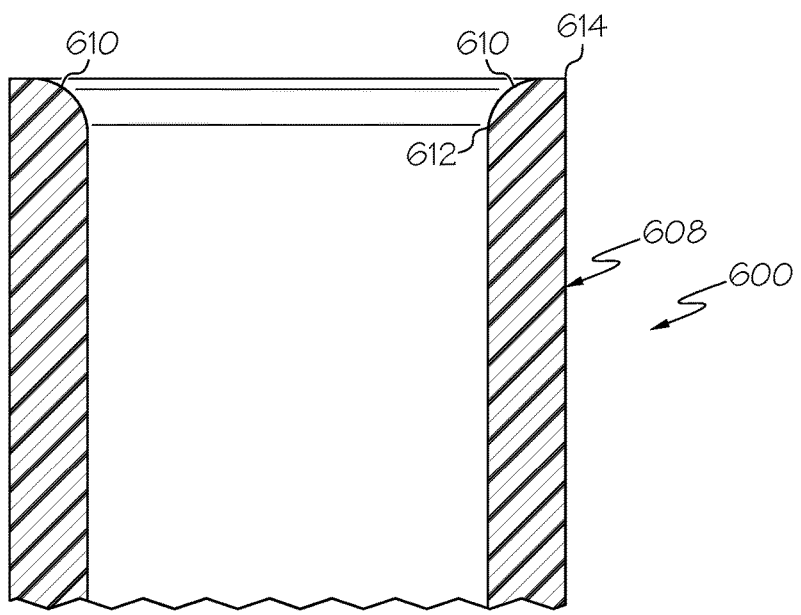
FIG. 13 is a schematic, sectional view of a portion of a gas vent for a landfill of FIG. 12.

FIGS. 10 & 11 depict an alternate hood 500 system designed to function with a conduit and a canister similarly to those described in previous examples, for example conduit 210 and canister 272 shown in FIGS. 3-5. The hood 500 has a generally similar construction to the previously described hood 250. The alternative hood 500 includes a conduit or pipe 502 that is directed towards a gas destruction system. The gas destruction system can include a suction pump to actively remove the gas released through the conduit 210 and canister 272. Alternatively, or in combination, the gas destruction system can have a periodic-activated spark that burns the gas. The hood 500 further includes a condensate drain plug 510 secured to a reducer 508 that connects the conduit 210 to the hood similarly to the previously-described embodiment. The condensate drain plug 510 releases condensate collected within the reducer 508.

Figure 14:
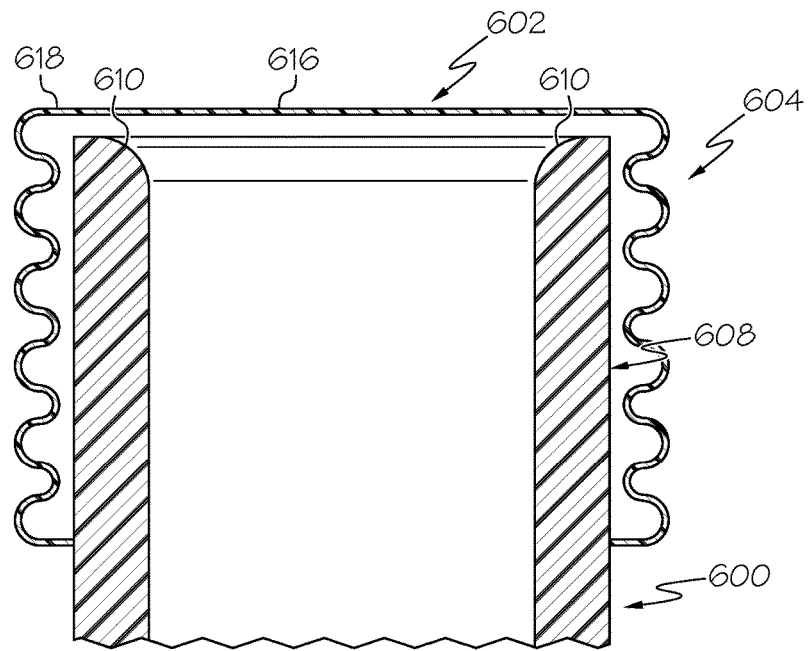
FIG. 14 is a schematic, sectional view of a portion of a gas vent for a landfill of FIG. 12, in which a valve membrane portion is lifted slightly and gas under pressure in a conduit can escape the conduit.
Figure 15:
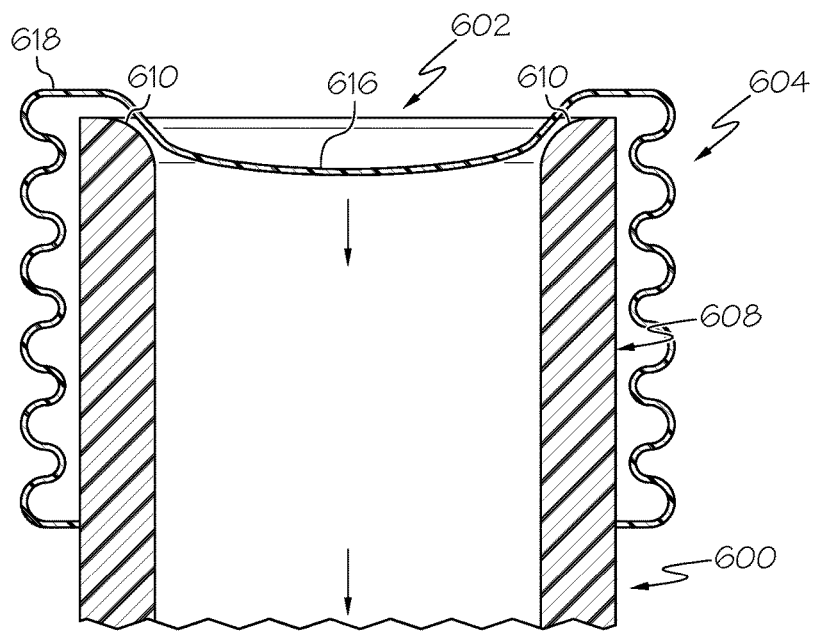
FIG. 15 is a schematic, sectional view of a portion of a gas vent for a landfill of FIG. 12, in which a valve membrane portion thereof creates a normal-position seal against outside/atmosphere air being drawn into a conduit from above.

FIGS. 12-15 depict a canister 604 (e.g., of the type depicted in FIGS. 8-9) loosely fitted about and atop an alternative upper portion 608 of a conduit 600. In this embodiment, the conduit upper portion 608 has a rounded edge 610 around its circumference. Similarly to the embodiment described in FIGS. 3-5, gravity and/or negative pressure in the conduit 600 pulls the canister 604 downwardly atop the open end of the conduit upper portion 608 during normal use, and the contact between the rounded circumferential edge 610 and the valve membrane 602 creates a normal-position seal against outside/atmosphere air being drawn into the conduit 600 from above, as depicted in FIG. 15. When the pressure in the conduit 600 is positive, the valve membrane 602 is lifted slightly, as depicted in FIG. 14, and then the gas under pressure in the conduit 600 can escape the conduit, for example into the hood (not depicted).

In the depicted embodiment, the peripheral edge or lip 610 of the conduit upper portion 608 is rounded or curved with the cross-sectional profile of one quadrant of a circle, with the inner edge 612 of the rounded lip 610 positioned lower than its outer edge 614, and with the inner edge 612 thereby defining a smooth transition between the rounded lip 610 and the inside surface of the conduit 600. When a vacuum is pulled (as indicated by the lower-most directional arrow in FIG. 15) inside the conduit (i.e., when the pressure is negative), the inner portion 616 of the valve membrane 602 positioned over the conduit open end is pulled downward (as indicated by the upper-most directional arrow in FIG. 15) and resiliently deforms and displaces downward into the conduit, while the outer portion 618 of the valve membrane 602 is not subjected to the vacuum force and thus remains in generally the same place. So the lower-positioned inner edge 612 of the peripheral lip 610, and the resulting relatively smooth (i.e., gradual, gentle, soft) transition at the inner edge 612 (relative to the sharp/hard transition at the outer edge 614), provides for a good seal with the valve membrane 602, because there are no sharp or significant changes in the surface or slope, and instead the surface is smooth (gradual in its slope change) for maintaining good sealing contact. And the rounded shape of the peripheral lip 610 provides for a good seal with the valve membrane 602, because there is more surface area (relative to a linear surface) for contacting to maintain a good seal.

In other embodiments, the peripheral lip has the cross-sectional shape of a semi-circle to provide the increased surface-area benefit, though the inner transition is not as smooth. In other embodiments, the peripheral lip has a cross-sectional shape/profile that is curved but not necessarily defining an arc of a circle (of varying radius), to provide the increased surface-area benefit. And in yet other embodiments, the conduit is not cylindrical and so the peripheral lip is not circular.

Those skilled in the art will appreciate that the particular sizes and components used herein are for illustrative purposes and that many modifications can be made thereto while still practicing the present invention. For example, in some applications, the size of the piping might need to be increased, while in other applications the piping might need to be smaller.

To install the collection manifold, the collection manifold is placed in the ground under where the geomembrane is (or is to be positioned), with the conduit extending vertically. An opening is made in the geomembrane and the geomembrane is placed over the conduit and above the collection manifold. In this regard there are several ways to provide the opening in the membrane, such as cutting a single slit, cutting an X-shaped pair of slits, cutting a roughly circular hole (such as with a hole saw), punching a hole, etc. After the geomembrane is placed over the conduit, the attachment thereto can be secured with the nut (and any optional washers/bosses, gaskets,etc., as described herein). Moreover, in those instances where it is desired to sandwich the geomembrane between two resilient gaskets, a first gasket is placed over the conduit before inserting the conduit up through the geomembrane. The geomembrane can take the form of a simple membrane or can be coupled to synthetic turf (as shown in FIG. 3).

Advantageously, the valve is both highly sensitive to very low positive pressure in the conduit and highly resistant to backflow of atmospheric air into the valve and thus into the landfill. The combination of the lightweight canister, highly flexible valve membrane, large surface area of the valve membrane, and the very thin contact patch between the valve membrane and the seat (whether an O-ring or a beveled or rounded edge on the conduit) makes for a very sensitive valve. Indeed, positive pressures in the conduit of only a few inches of water column (a fraction of an atmosphere) are sufficient to lift the valve membrane slightly off the seat and vent the gas. Conversely, when the conduit is experiencing negative pressures (most of the time), the negative pressure pulls downwardly on the large area valve membrane, producing an excellent seal against atmospheric intrusion into the landfill, avoiding mixing air with the gas produced by the landfill. Indeed, the unit has been tested and found to seal/release at about 0.3 inches of water column.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A gas vent for a landfill, the landfill having a geomembrane, the gas vent comprising:
    a sub-surface gas collection manifold for collecting sub-surface gas from beneath a geomembrane, the collection manifold comprising a plenum for receiving sub-surface gas, the plenum defining an interior volume;
    a conduit connected to and extending upwardly from the plenum, the conduit communicating with the interior volume of the plenum and having an upper discharge end, the conduit being adapted and provided for extending through an aperture in the geomembrane for communicating sub-surface gas from within the interior volume of the plenum through the geomembrane;
    a hood positioned adjacent an upper portion of the conduit and defining a discharge chamber therein into which gas from the discharge end of the conduit is discharged, the hood also having a discharge outlet for venting gas from within the discharge chamber; and
    a low-pressure relief valve associated with the conduit and being operative for opening when positive pressure exists within the conduit, the low-pressure relief valve comprising a valve membrane normally resting upon a seat and lifted off the seat by low positive pressure.

2. The gas vent as claimed in claim 1 wherein the valve membrane is affixed to a canister and the canister is fitted loosely about the upper discharge end of the conduit such that low positive pressure in the conduit lifts the valve membrane and thus opens the low-pressure relief valve.

3. The gas vent as claimed in claim 1 wherein the low pressure relief valve comprises a tapered edge formed at the upper discharge end of the conduit for sealing against the valve membrane.

4. The gas vent as claimed in claim 1 wherein the low pressure relief valve comprises a resilient O-ring positioned at the upper discharge end of the conduit for sealing against the valve membrane.

5. The gas vent as claimed in claim 2 wherein the canister comprises a generally smooth cylinder.

6. The gas vent as claimed in claim 5 wherein the canister includes one or more discharge ports in a side thereof.

7. The gas vent as claimed in claim 2 wherein the canister comprises a generally corrugated cylinder.

8. The gas vent as claimed in claim 7 wherein the canister includes one or more discharge ports in a side thereof.

9. The gas vent as claimed in claim 1 wherein the hood is vented to atmosphere.

10. The gas vent as claimed in claim 1 wherein the hood includes a coupling for connecting the hood to an external burner for destruction of the gas.

11. A gas vent for a landfill and for use with a sub-surface gas collection manifold for collecting sub-surface gas from beneath a geomembrane in the landfill, the collection manifold defining an interior volume, the gas vent comprising:
    a conduit adapted to be connected to and extend upwardly from the collection manifold, with the conduit communicating with the interior volume of the collection manifold and having an upper discharge end, and wherein the conduit is adapted and provided for extending through an aperture in the geomembrane for communicating sub-surface gas from within the interior volume of the collection manifold through the geomembrane; and
    a low-pressure relief valve having a valve membrane and associated with the conduit and being operative for opening when positive pressure exists within the conduit, wherein the low pressure relief valve comprises a resilient O-ring positioned at the upper discharge end of the conduit for sealing against the valve membrane.

12. The gas vent as claimed in claim 11 wherein the valve membrane is affixed to a canister and the canister is fitted loosely about the upper discharge end of the conduit such that low positive pressure in the conduit lifts the valve membrane and thus opens the low-pressure relief valve, and wherein the canister comprises a generally smooth cylinder.

13. The gas vent as claimed in claim 12 wherein the canister includes one or more discharge ports in a side thereof.

14. A gas vent for a landfill and for use with a sub-surface gas collection manifold for collecting sub-surface gas from beneath a geomembrane in the landfill, the collection manifold defining an interior volume, the gas vent comprising:
    a conduit adapted to be connected to and extend upwardly from the collection manifold, with the conduit communicating with the interior volume of the collection manifold and having an upper discharge end, and wherein the conduit is adapted and provided for extending through an aperture in the geomembrane for communicating sub-surface gas from within the interior volume of the collection manifold through the geomembrane; and
    a low-pressure relief valve associated with the conduit and being operative for opening when positive pressure exists within the conduit, wherein the low pressure relief valve includes a valve membrane affixed to a canister and the canister is fitted loosely about the upper discharge end of the conduit such that low positive pressure in the conduit lifts the valve membrane and thus opens the low-pressure relief valve, and wherein the canister comprises a generally corrugated cylinder.

15. The gas vent as claimed in claim 14 wherein the canister includes one or more discharge ports in a side thereof.

16. The gas vent as claimed in claim 14 wherein the gas vent is vented to atmosphere.

17. A gas vent for a landfill and for use with a sub-surface gas collection manifold for collecting sub-surface gas from beneath a geomembrane in the landfill, the collection manifold defining an interior volume, the gas vent comprising:
    a conduit adapted to be connected to and extend upwardly from the collection manifold, with the conduit communicating with the interior volume of the collection manifold and having an upper discharge end, and wherein the conduit is adapted and provided for extending through an aperture in the geomembrane for communicating sub-surface gas from within the interior volume of the collection manifold through the geomembrane; and
    a low-pressure relief valve associated with the conduit and being operative for opening when positive pressure exists within the conduit, wherein the gas vent includes a coupling for connecting the gas vent to an external burner for destruction of the gas.

18. A gas vent for a landfill and for use with a sub-surface gas collection manifold for collecting sub-surface gas from beneath a geomembrane in the landfill, the collection manifold defining an interior volume, the gas vent comprising:
    a conduit adapted to be connected to and extend upwardly from the collection manifold, with the conduit communicating with the interior volume of the collection manifold and having an upper discharge end, and wherein the conduit is adapted and provided for extending through an aperture in the geomembrane for communicating sub-surface gas from within the interior volume of the collection manifold through the geomembrane; and a low-pressure relief valve having a valve membrane and associated with the conduit and being operative for opening when positive pressure exists within the conduit, wherein the low pressure relief valve comprises a rounded lip formed at the upper discharge end of the conduit for sealing against the valve membrane.

19. The gas vent as claimed in claim 18 wherein the rounded lip has an outer edge and an inner edge that is lower than the outer edge, and wherein the inner edge defines a smooth transition between the lip and an inner surface of the conduit.

\* \* \* \* \*